United States Patent
Zhao et al.

(10) Patent No.: US 6,452,541 B1
(45) Date of Patent: Sep. 17, 2002

(54) TIME SYNCHRONIZATION OF A SATELLITE POSITIONING SYSTEM ENABLED MOBILE RECEIVER AND BASE STATION

(75) Inventors: Yilin Zhao, Northbrook, IL (US); Hugh Wang, San Diego, CA (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/788,753

(22) Filed: Feb. 20, 2001

(51) Int. Cl.[7] .............................. G01S 5/14; H04J 3/07
(52) U.S. Cl. ................... 342/357.06; 370/519; 375/356
(58) Field of Search .................. 342/357.06; 455/456; 370/519, 508; 375/356

(56) References Cited

U.S. PATENT DOCUMENTS

| | | | | |
|---|---|---|---|---|
| 5,697,051 A | * | 12/1997 | Fawcett | 455/13.2 |
| 5,703,873 A | | 12/1997 | Ojampera et al. | 370/332 |
| 5,812,087 A | | 9/1998 | Krasner | 342/357 |
| 5,872,774 A | * | 2/1999 | Wheatley et al. | 370/252 |
| 5,945,944 A | | 8/1999 | Krasner | 342/357.06 |
| 6,052,081 A | | 4/2000 | Krasner | 342/357.02 |
| 6,104,729 A | | 8/2000 | Hellum et al. | 370/503 |
| 6,166,691 A | * | 12/2000 | Lindqvist | 342/465 |
| 6,295,023 B1 | * | 9/2001 | Bloebaum | 342/357.06 |
| 6,313,787 B1 | * | 11/2001 | King et al. | 342/357.03 |
| 2001/0034210 A1 | * | 10/2001 | Nir et al. | 455/71 |
| 2001/0039192 A1 | * | 11/2001 | Osterling et al. | 455/502 |

FOREIGN PATENT DOCUMENTS

| | | |
|---|---|---|
| WO | WO 00/14560 | 3/2000 |
| WO | WO 00/14562 | 3/2000 |

OTHER PUBLICATIONS

Dr. Scott Bloebaum, *Alternatives for GPS Timing and Sensitivity Assistance*, Jan. 24, 2000, T1P1.5/2000–032r0.

Jari Syjärinne, *Wireless Assistant GPS Keeping Time with Mobiles*, GPS World–Jan. 2000, pp. 22–31.

* cited by examiner

Primary Examiner—Gregory C. Issing
(74) Attorney, Agent, or Firm—Roland K. Bowler, II

(57) ABSTRACT

Satellite positioning system enabled mobile receivers (310) and cellular communication network base stations (330) synchronized with satellite positioning system clocks and method therefore. In a network-assisted embodiment, a variable propagation delay for transmission of an assistance message (232) from the base station to the mobile receiver is determined for correcting the handset clock (318). In others embodiments, local clock drift of mobile receivers (310) and/or base stations (330) are determined by a ratio of local and satellite time differences, based on sequential time snapshots, for use in correcting the local clocks.

20 Claims, 3 Drawing Sheets

TIME SYNCHRONIZATION OF A SATELLITE POSITIONING SYSTEM ENABLED MOBILE RECEIVER AND BASE STATION

FIELD OF THE INVENTIONS

The present inventions relate generally to locating mobile receivers, and more particularly to time-synchronizing network base stations and satellite positioning system enabled mobile receivers, for example GPS enabled cellular handsets in cellular communications networks.

BACKGROUND OF THE INVENTIONS

Satellite positioning system enabled mobile receivers are known generally, and include for example navigational and two-way radio communication devices.

Known satellite positioning systems include the Navigation System with Time and Range (NAVSTAR) Global Positioning System (GPS) in the United States of America, the Global Navigation Satellite System (GLONASS) in Russia, and the proposed European satellite navigation system (Galileo).

Regulatory and market driven forces are motivating communications equipment manufacturers and service providers to more quickly and accurately locate these and other mobile receivers, for example, to support enhanced emergency 911 (E-911) services, to provide promotional and fee based value-added services, for navigation, etc.

In the near term, network-assisted satellite based positioning schemes will likely support some of the demand for mobile receiver location services, especially for cellular handsets in cellular communication networks. The positioning of mobile receivers may also be made autonomously, in other words without network assistance.

BRIEF DESCRIPTION OF THE DRAWINGS

The various aspects, features and advantages of the present inventions will become more fully apparent to those having ordinary skill in the art upon careful consideration of the following detailed description thereof in conjunction with the accompanying drawings, which are described below.

DETAILED DESCRIPTION OF THE INVENTIONS

The internal or local clocks of mobile receivers are generally not as accurate as those of satellite positioning systems. The local clocks of cellular communication network base stations, used in network-assisted satellite positioning systems, are also comparatively imprecise.

Improved timing and synchronization in mobile receivers and in network base stations will provide improved positioning performance in both autonomous and network-assisted satellite positioning system based location schemes.

Figure 1:
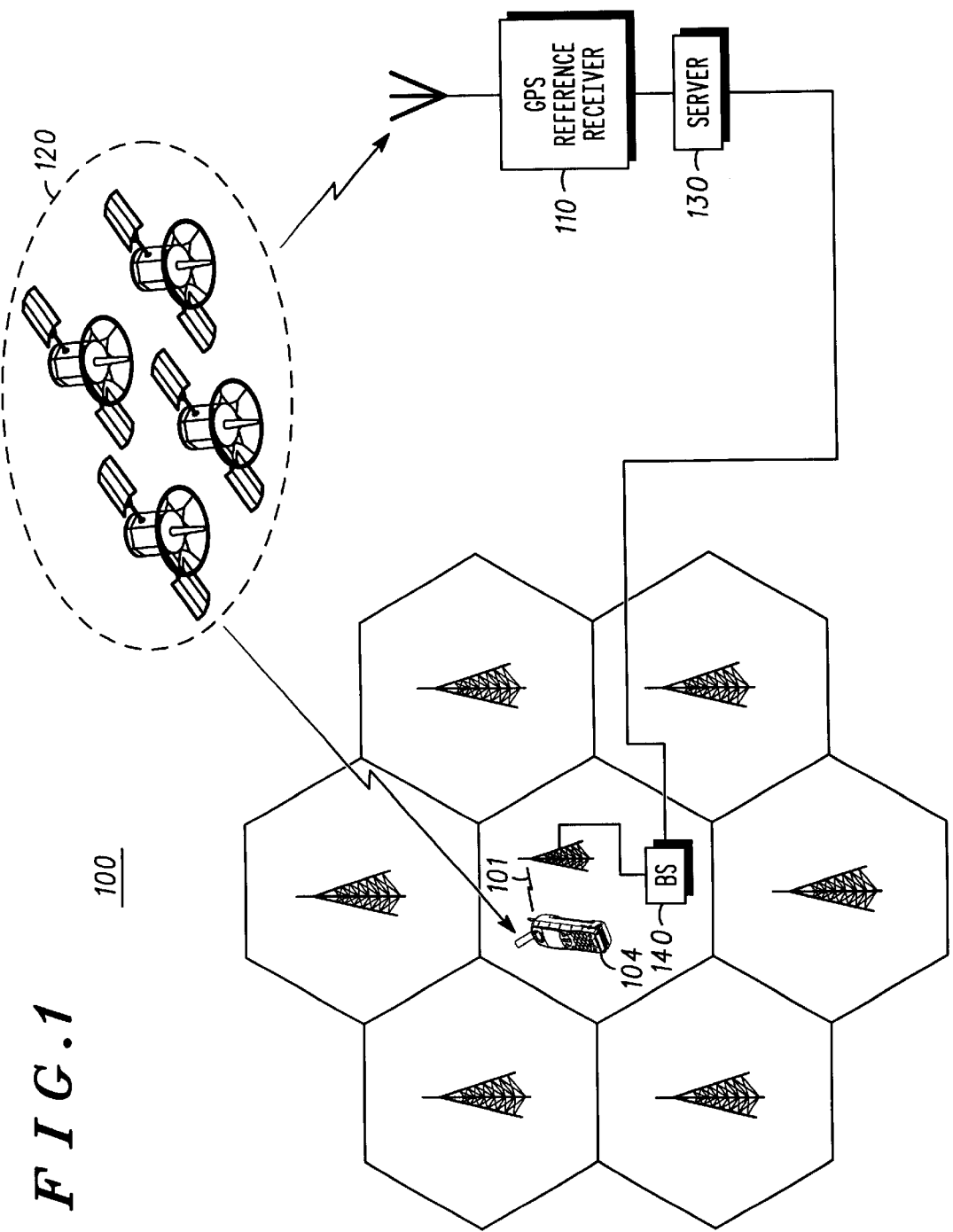
FIG. 1 illustrates a cellular communication network supporting assisted satellite positioning system location of a satellite positioning system enabled mobile receiver.

FIG. 1 is a network-assisted satellite positioning system 100 including generally a reference receiver at a surveyed location having an unobstructed skyward view of satellites 120 in a constellation, and a server, or reference node, 130 coupled thereto. In some networks, the reference receiver is a part of the server or vice versa, and the combination thereof constitutes the reference node. In other networks, the server is at another location. The reference node is generally coupled to several network base stations directly or indirectly via other network nodes, only one of which, base station 140, is identified in FIG. 1.

The reference receiver receives satellite signals, and the reference node generates assistance messages based on the received satellite signals in a format suitable for transmission over the network to one or more mobile receivers. The assistance messages are generally modulated on a cellular carrier signal 101, which is transmitted in a point-to-point mode to a particular cellular handset 104, or in a point-to-multipoint, or broadcast, mode to multiple mobile receivers.

The assistance message includes, for example, reference location, reference time, GPS time, GPS time of Week (TOW), TOW assist, Doppler, code phase as well as its search windows, ephemeris and clock corrections, ionospheric delay elements, Universal Time Coordinate (UTC) offsets, Almanac, real-time integrity data, among other information. GPS time is generally stamped on the assistance message at the server, or more generally at the reference node. In Differential Global Positioning Systems (DGPS), the assistance message may include differential correction information.

In assisted satellite positioning schemes where an assistance message having GPS time is transmitted from the reference node to the mobile receiver via the network, there is a delay, referred to herein as a propagations delay, between the time the GPS time is applied to the assistance message and the time the assistance message is received at the mobile receiver.

The propagation delay generally has one or more fixed and variable components, $T_{FIXED\ DELAY}$ and $T_{VARIABLE\ DELAY}$, which when summed constitute the total propagation delay, $T_{PROPTOTAL}$. In FIG. 1, for example, the distance between the reference node and base station is fixed, and thus the propagation delay therebetween is generally known in advance or is at least reasonably predictable by virtue of the fixed distance therebtween. The propagation delay between the base station 140 and the mobile receiver 104, however, is generally variable since the location of the mobile receiver relative to the base station changes as the mobile receiver moves about.

Many cellular communication networks periodically determine a round trip delay (RTD) between the base and a mobile station for hand-offs or time slot synchronization, etc. In Global Systems for Mobile (GSM) communication networks and other networks, the RTD is known as timing advance (TA). In 3G W-CDMA based networks, RTD is known as round trip time (RTT). Other communication networks also determine a round trip delay (RTD), which generally provides an estimate of the distance between the mobile receiver and the base station.

In networks that generate RTD measurements in bits having a corresponding bit duration (BD), an estimated propagation delay between the base station and the mobile receiver is proportional to a product of the RTD and the BD as follows:

$$T_{VARIABLEDELAY}=[1/2]*[RTD]*[BD]. \qquad (1)$$

The BD and bit duration resolution (BDR) for a particular network are generally specified in the corresponding cellular communication standards. In GSM networks, for example, the estimated propagation delay between a base station and a mobile receiver is:

$$T_{VARIABLEDELAY}=[1/2]*[TA]*[3.692\text{ms}], \quad (2)$$

where TA is the timing advance and 3.692 is the bit duration (BD) in a GSM network.

In GSM networks, the timing advance (TA) is determined at the base station approximately every 480 ms. Thus a handset traveling at a speed of 100 km per hour during the time interval between subsequent TA determinations may move as far as about 13 meters.

Figure 2:
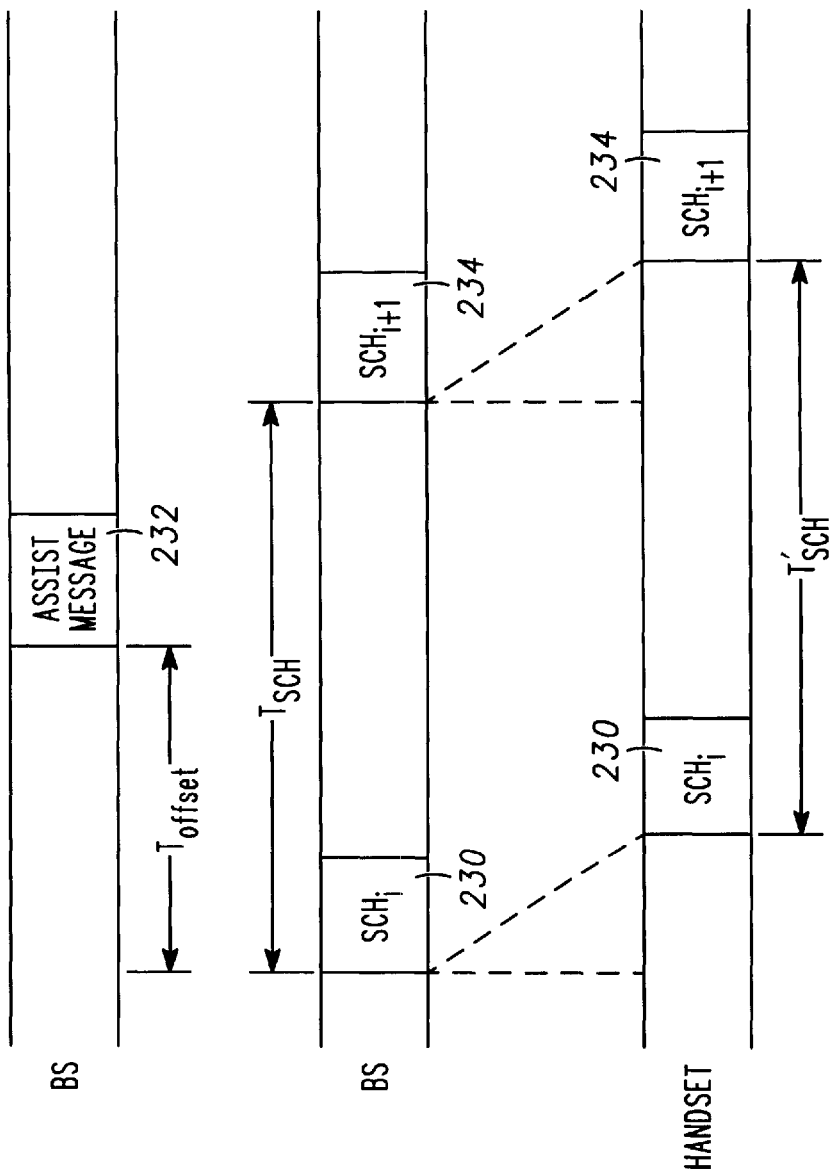
FIG. 2 is an exemplary cellular communication network synchronization signal timing diagram.

In FIG. 2, a more accurate estimate of the propagation delay between the base station and the mobile receiver may be determined by using an estimated round trip delay (eRTD) determined as follows:

$$eRTD=RTD+(T'_{SCH}/T_{SCH}+1)*(T_{OFFSET}), \quad (3)$$

where $T_{SCH}$ is the time interval between subsequent synchronization bursts, or pilot signals, $SCH_i$ 230 and $SCH_{i+1}$ 234 transmitted from the base station. $T'_{SCH}$ is the time interval between the reception of sequential synchronization signals, $SCH_i$ and $SCH_{i+1}$, at the mobile receiver. $T'_{SCH}$ is generally different than $T_{SCH}$, depending on whether the mobile receiver is moving toward or away from the base station. $T_{OFFSET}$ is the interval measured between the transmission of a synchronization signal, for example $SCH_i$, and the transmission of an Assistance Message 232. In GSM and other networks, $T_{SCH}$ and $T_{OFFSET}$ or analogous quantities are also known.

An estimated variable propagation delay between the mobile receiver and the base station may be determined by substituting the estimated round trip delay (eRTD) of equation (3) for RTD in equation (1) as follows:

$$T_{VARIABLEDELAY}=[1/2]*[RTD+(T'_{SCH}/T_{SCH}-1)* (T_{OFFSET})]*[BD]. \quad (4)$$

In a GSM network, equation (4) may be expressed as follows:

$$T_{VARIABLEDELAY}=[1/2]*[TA+(T'_{SCH}/T_{SCH}-1)*(T_{OFFSET})]*[3.692]. \quad (5)$$

The propagation delay determined according to equations (4) and (5) compensates for movement of the mobile receiver relative to the base station during the interval between periodic RTD determinations.

Another approach to determining the propagation delay between the mobile station and the base station may be determined as follows:

$$T_{VARABLEDELAY}=[1/2]*[RTD]*[BD]+[T_{CORRECTION}]. \quad (6)$$

The correction time component, $T_{CORRECTION}$, is proportional to a product of the bit duration resolution (BDR) and an average of two or more $T'_{SCH}$ measurements at the mobile receiver as follows:

$$T_{CORRECTION} = \left[\left[\sum_{i=1}^{n} T'_{SCH}\right]/n\right]*[BDR]. \quad (7)$$

In GSM networks, for example, the BD has quarter-bit resolution at the mobile receiver, i.e. BDR=0.923 ms where BD=3.692 ms, and equation (6) is expressed as follows:

$$T_{VARIABLDELAY} = [1/2]*[TA]*[ \quad (8)$$
$$3.692\text{ ms}] + \left[\left[\sum_{i=1}^{n} T'_{SCH}\right]/n\right]*[0.923\text{ ms}].$$

The $T_{CORRECTION}$ component provides a higher degree of resolution, dependent upon the resolution of the bit duration, BDR, which is specified in the cellular communication standards for the particular network. Equations (6) and (8) are better suited for determining the variable propagation delay when the mobile receiver is stationary, whereas equations (4) and (5) are better suited for determining the variable propagation delay when the mobile receiver is moving relative to the base station.

As noted, the total propagation delay may be determined by summing the fixed propagation delay with the variable propagation delay as determined by one of the general equations (4) and (6) discussed above. The total propagation delay is used in the handset to compensate for the time required to propagate the assistance message to the mobile receiver, for example the total propagation delay time may be added to the GPS time stamped onto the assistance message.

It is desirable generally to periodically synchronize the local clock of the handset with satellite positioning system time directly, provided that the handset has an unobstructed skyward view of a satellite in the constellation.

Figure 3:
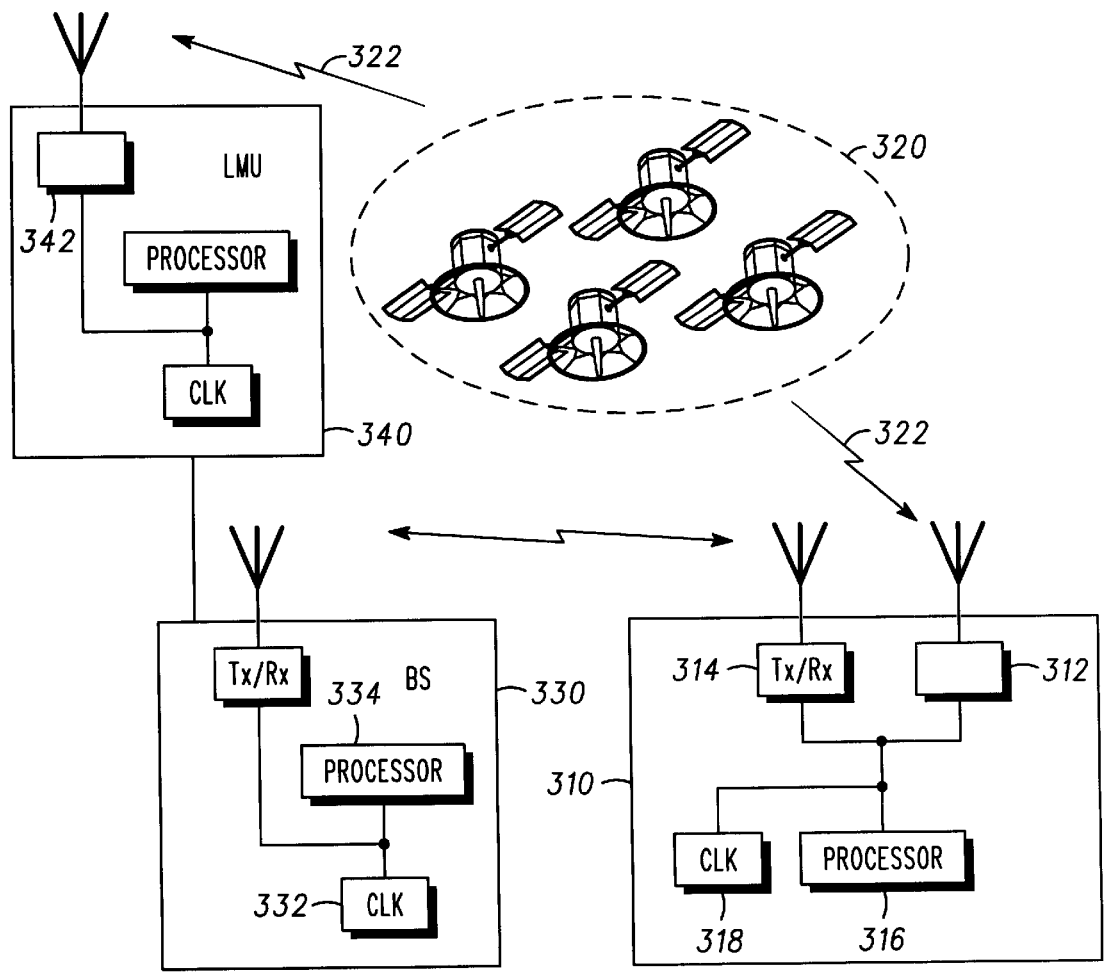
FIG. 3 is an exemplary cellular communication network-assisted satellite positioning system.

FIG. 3 illustrates a mobile receiver 310 in the exemplary form of a cellular handset comprising a communications network interface 314, for example a transmitter/receiver (Tx/Rx), for communicating with a cellular communication network base station 330. Alternatively, the mobile receiver 310 may be a handheld or mounted GPS navigation or tracking device, with or without a communication network interface.

The mobile receiver 310 further comprises a satellite signal reception interface 312, for example a GPS measurement sensor, for receiving satellite signals 322 from satellites in an overhead constellation 320. The mobile receiver also includes a processor 316 having memory associated therewith coupled to the satellite signal reception interface, and a local clock 318. The exemplary cellular handset may be configured for autonomous or network-assisted positioning. The sensor 312 can be a fully functional GPS receiver. Alternatively, this fully functioned GPS receiver can be an independent device connected with the cellular phone, such as an accessory.

Figure 4:
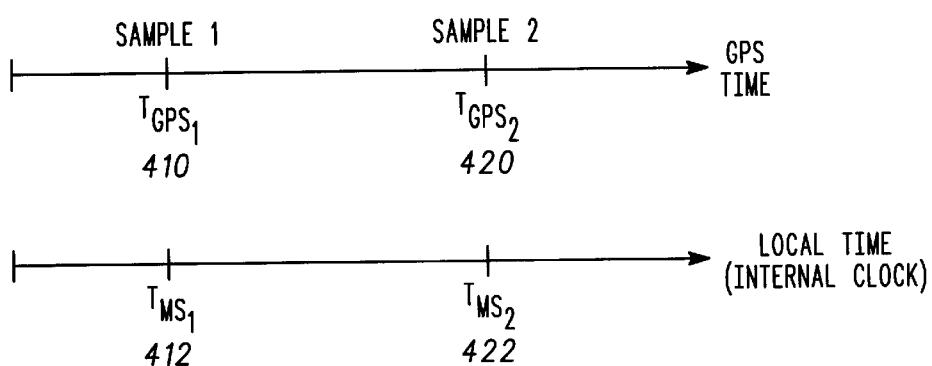
FIG. 4 is an exemplary time signal sampling diagram.

FIG. 4 illustrates the sampling of satellite time and local clock time at the mobile receiver. More particularly, the mobile receiver samples first and second satellite times $T_{GPS1}$ 410 and $T_{GPS2}$ 420 and first and second local clock times $T_{MS1}$ 412 and $T_{MS2}$ 422.

The first satellite signal preferably has the same relationship to the first clock signal as the second satellite signal has to the second clock signal. In one embodiment, the first satellite signal is sampled concurrently with the first local clock signal, and the second satellite signal is sampled concurrently with the second local clock signal. If there is a delay between the sampling of the first satellite and local clock signals, the same delay exists between the sampling of the second satellite and local clock signals.

The drift of the local clock in the mobile receiver, or mobile station, may be determined as follows:

$$T_{DRIFTMOBILE}=[T_{MS1}-T_{MS2}]/[T_{GPS1}-T_{GPS2}]. \quad (9)$$

The local clock drift is calculated in the handset by the processor 316, for example under control by a software program. The calculated local clock drift may thus be used to correct the local clock, for example by adding or subtracting the calculated drift to or from the local clock time, depending on whether the local slow or fast.

In cellular communications networks that provide location assistance, the base station 330 may have associated therewith a GPS receiver, for example a GPS receiver 342 which is part of a location measurement unit (LMU) 340 used to provide measurements for location services. The LMU may be part of the base station or alternatively may be connected to the base station either directly or via an air interface.

In applications where an assistance message is transmitted to the mobile receiver from a cellular communication network, the local clocks 332 in the base stations may be corrected. A processor 334 with memory in the base station may sample GPS time, for example that derived from the GPS receiver 342 in the LMU, and the local clock 332 to calculate local drift as follows:

$$T_{DRIFTBS}=[T_{BST1}-T_{BST2}]/[T_{GPS1}-T_{GPS2}]. \quad (10)$$

Alternatively, the processor in the LMU 340 can perform the sampling and drift calculation. Those of ordinary skill in the art will also realize that the same technique can be applied to the base station that has a similar architecture as the mobile receiver 310.

The local clocks in the mobile receiver and the base stations are preferably corrected periodically. The local clock drift may also be updated periodically as discussed above, although the drift rate is substantially constant over relatively short time intervals, and thus need not be updated as frequently as the local clock is corrected. Assuming the local clock oscillator has a drift rate of approximately 50 nanoseconds per second, a 1 ms clock precision may be maintained by correcting the local clock approximately every 5.5 hours.

While the present inventions have been described hereinabove to enable those of ordinary skill in the art to make and use what is presently considered to be the best modes thereof, those of ordinary skill will understand and appreciate that equivalents, modifications and variations may be made thereto without departing from the scope and spirit of the invention, which is to be limited not by the exemplary embodiments but by the appended claims.

What is claimed is:

1. A method for synchronizing a satellite positioning system enabled mobile receiver having a local clock with a satellite positioning system, comprising:
    sampling first and second satellite signals at the mobile receiver;
    sampling first and second local clock signals at the mobile receiver, the first local clock signal having the same relationship to the first satellite signal as the second local clock signal has to the second satellite signal;
    determining a local clock drift proportional to a difference between the first and second sampled satellite signals divided by a difference between the first and second local clock signals;
    correcting the local clock based upon the local clock drift.

2. The method of claim 1, sampling the first satellite signal and the first local clock signal at substantially the same time, sampling the second satellite signal and the second local clock signal at substantially the same time.

3. The method of claim 1, the mobile receiver is a cellular handset for use in a cellular communication network, periodically correcting the local clock, updating the local clock drift less frequently than the local clock is corrected.

4. The method of claim 3, sampling the first satellite signal and the first local clock signal at substantially the same time, sampling the second satellite signal and the second local clock signal at substantially the same time.

5. A method for synchronizing a cellular communications network base station local clock with a satellite positioning system clock, comprising:
    sampling first and second satellite signals having satellite time at the base station;
    sampling first and second base station local clock signals, the first local clock signal having the same relationship to the first satellite signal as the second local clock signal has to the second satellite signal;
    determining a local clock drift proportional to a difference between satellite times of the first and second satellite signals divided by a difference between the first and second local clock signals;
    correcting the local clock based upon the local clock drift.

6. The method of claim 5, re-correcting the local clock.

7. The method of claim 5, sampling the first satellite signal and the first local clock signal at substantially the same time, sampling the second satellite signal and the second local clock signal at substantially the same time.

8. A satellite positioning system enabled mobile receiver, comprising:
    a satellite positioning system interface for receiving satellite signals having satellite time from a satellite positioning system;
    a local clock;
    means for determining a local clock drift ($T_{DRIFTMOBILE}$) proportional to $[T_{MS1}-T_{MS2}]/[T_{GPS1}-T_{GPS2}]$,
    where $T_{MS1}$ and $T_{MS2}$ are first and second sampled local clock times and $T_{GPS1}$ and $T_{GPS2}$ are first and second sampled satellite times,
    the first satellite time having the same relationship to the first local clock time as the second satellite time having to the second local clock time.

9. The mobile receiver of claim 8, means for correcting the local clock based on the local clock drift.

10. The mobile receiver of claim 8 is a satellite positioning system enabled cellular handset comprising a wireless communications interface for communicating in a cellular communication network.

11. A cellular communication network base station, comprising:
    a satellite positioning system interface for receiving satellite signals having satellite time from a satellite positioning system;
    a local clock;
    means for determining a local clock drift ($T_{DRIFTBS}$) proportional to $[T_{BS1}-T_{BS2}]/[T_{GPS1}-T_{GPS2}]$,
    where $T_{BS1}$ and $T_{BS2}$ are first and second sampled local clock times and $T_{GPS1}$ and $T_{GPS2}$ are first and second sampled satellite times,
    the first satellite time having the same relationship to the first local clock time as the second satellite time having to the second local clock time.

12. The base station of claim 11, means for correcting the local clock based on the local clock drift.

13. A method for synchronizing a satellite positioning system enabled mobile receiver in a network having a base station that periodically determines a round trip delay (RTD) between the mobile receiver and a base station based on a known bit duration (BD) and that transmits an assistance message with satellite time between synchronization signals transmitted at a known synchronization interval, comprising:

determining a time factor that compensates for movement of the mobile receiver relative to the base station;

determining an estimated round trip delay (eRTD) based on the RTD and the time factor that compensates for movement of the mobile receiver;

determining an estimated propagation delay between the base station and the mobile receiver proportional to a product of the eRTD and the BD;

setting a clock in the mobile receiver based on the estimated propagation delay.

14. The method of claim 13, the assistance message transmitted at a known assistance message time offset relative to the transmission of a synchronization signal, determining a time interval between sequential synchronization bursts received at the mobile receiver;

determining a time difference between the time interval and the known synchronization interval;

determining the time factor proportional to a product between the time difference and a ratio of the assistance message offset divided by the known synchronization interval.

15. The method of claim 13, generating the assistance message at a reference node, transmitting the assistance message from the reference node to the base station, determining a total propagation delay between the reference node and the mobile receiver by adding the estimated propagation delay to a propagation delay between the reference node and the base station, setting the clock in the mobile receiver based on the total propagation delay.

16. The method of claim 13, determining the estimated round trip delay (eRTD) by calculating eRTD=RTD+[$T'_{SCH}/T_{SCH}-1$]*[$T_{OFFSET}$], where $T_{SCH}$ is the synchronization interval and $T'_{SCH}$ is an interval between sequential synchronization signal received at the mobile receiver, and where $T_{OFFSET}$ is a time interval between a synchronization signal and the assistance message;

determining the estimated propagation delay ($T_{PROP}$) between the base station and the mobile receiver by calculating $T_{PROP}$=[1/2]*[eRTD]*[BD].

17. A satellite positioning system enabled mobile receiver in a network having a base station that periodically determines a round trip delay (RTD) between the mobile receiver and a base station based on a known bit duration (BD) and that transmits an assistance message with satellite time between synchronization signals transmitted at a known synchronization interval ($T_{SCH}$), comprising:

means for determining an estimated round trip delay, eRTD=RTD+[$T'_{SCH}/T_{SCH}-1$]*[$T_{OFFSET}$], between the mobile receiver and the base station, where $T_{OFFSET}$ is a time interval between a synchronization signal and the assistance message, and $T'_{SCH}$ is a time interval between sequential synchronization bursts received at the mobile receiver;

means for determining an estimated propagation delay, $T_{PROP}$=[1/2]*[eRTD]*[BD], between the base station and the mobile receiver;

means for synchronizing a clock in the mobile receiver based on the estimated propagation delay.

18. A method for synchronizing a satellite positioning system enabled mobile receiver in a network having a base station that periodically determines a round trip delay (RTD) between the mobile receiver and a base station based on a known bit duration (BD) and that transmits an assistance message with satellite time between synchronization signals transmitted at a known synchronization interval, comprising:

determining a time correction component proportional to a product of a resolution of the bit duration and an average of two or more time intervals between sequential synchronization signals received at the mobile receiver;

determining an estimated propagation delay between the base station and the mobile receiver proportional to a summation of RTD and the time correction component;

setting a clock in the mobile receiver based on the estimated propagation delay.

19. The method of claim 18, determining a time correction, $T_{CORRECTION}$, component by calculating:

$$T_{CORRECTION} = \left[\left[\sum_{i=1}^{n} T'_{SCH}\right]/n\right][BDR],$$

where $T'_{SCH}$ is an average of an interval between two or more synchronization signals $T_{SCH}$ received at the mobile receiver and n is the number of intervals;

determining the estimated propagation delay, $T_{DELAY}$, by calculating: $T_{DELAY}$=[1/2]*[RTD]*[BD]+[$T_{CORRECTION}$], where BD is the bit duration, and where BDR is bit duration resolution of the bit duration.

20. A satellite positioning system enabled mobile receiver in a network having a base station that periodically determines a round trip delay (RTD) between the mobile receiver and a base station based on a known bit duration (BD) having a bit duration resolution (BDR) and that transmits an assistance message with satellite time between synchronization signals, $T_{SCH}$, transmitted at a known synchronization interval, comprising:

means for determining a time correction component, $$T_{CORRECTION} = \left[\left[\sum_{i=1}^{n} T'_{SCH}\right]/n\right][BDR],$$

where $T'_{SCH}$ is an average of an interval between two or more synchronization signals $T_{SCH}$ received at the mobile receiver;

means for determining an estimated propagation delay, $T_{DELAY}$=[1/2]*[RTD]*[BD]+[$T_{CORRECTION}$], between the base station and the mobile receiver;

means for synchronizing a dock in the mobile receiver based on the estimated propagation delay.

* * * * *

UNITED STATES PATENT AND TRADEMARK OFFICE
CERTIFICATE OF CORRECTION

PATENT NO.    : 6,452,541 B1
DATED         : September 17, 2002
INVENTOR(S)   : Zhao et al.

It is certified that error appears in the above-identified patent and that said Letters Patent is hereby corrected as shown below:

<u>Column 8,</u>
Line 58, change "a dock" to -- a clock --

Signed and Sealed this

Twenty-eighth Day of January, 2003

JAMES E. ROGAN
*Director of the United States Patent and Trademark Office*